Sept. 24, 1935.   T. W. ROLPH   2,015,235
PRISMATIC LIGHT CONTROLLING DEVICE AND METHOD OF MAKING THE SAME
Filed Nov. 3, 1933   3 Sheets-Sheet 1

INVENTOR.
Thomas W. Rolph
BY
ATTORNEY

Sept. 24, 1935. T. W. ROLPH 2,015,235
PRISMATIC LIGHT CONTROLLING DEVICE AND METHOD OF MAKING THE SAME
Filed Nov. 3, 1933 3 Sheets-Sheet 2

INVENTOR.
Thomas W. Rolph.
BY
ATTORNEY.

Sept. 24, 1935.　　　　　T. W. ROLPH　　　　　2,015,235
PRISMATIC LIGHT CONTROLLING DEVICE AND METHOD OF MAKING THE SAME
Filed Nov. 3, 1933　　　3 Sheets-Sheet 3

INVENTOR.
Thomas W. Rolph
BY
ATTORNEY.

Patented Sept. 24, 1935

2,015,235

UNITED STATES PATENT OFFICE 2,015,235

PRISMATIC LIGHT CONTROLLING DEVICE
AND METHOD OF MAKING THE SAME

Thomas W. Rolph, Newark, Ohio, assignor to
Holophane Company, Inc., New York, N. Y., a
corporation of Delaware Application November 3, 1933, Serial No. 696,484

13 Claims.  (Cl. 240—103)

This invention relates to prismatic light controlling devices, such as glass reflectors and refractors, and methods of making the same and particularly to the manufacture of such articles having parallel concentric prisms on the inside and being substantially smooth outside. Prismatic reflectors of this construction act by means of total reflection at the outside smooth surface. The internal prisms provide sufficient redirection of light to produce incidence at the outer surface at angles greater than the critical angle, thereby insuring total reflection. Prismatic refractors are similar in construction but the redirection of light obtained by the interior prisms is not sufficient to cause incidence at the outer surface at angles greater than the critical angle. Hence, the light is refracted and passes out through the outer surface instead of being reflected. Typically the lamp axis is vertical and the prisms run in horizontal planes but it is possible to tip the lamp or the reflecting or refracting equipment or any part of it so that the prisms may run in other planes.

Prismatic reflectors, smooth outside with internal horizontal prisms, have been produced in the past and operate quite efficiently throughout a certain range of incident light. One great drawback of such reflectors, however, has been that the transmitted light is usually concentrated within a narrow region on the reflector and this causes the reflector to appear too bright and glaring when viewed. Furthermore, such reflectors operate efficiently only throughout a certain angular range and are, therefore, somewhat limited in their field of usefulness.

The formation of the internal prisms in both reflectors and refractors is determined by the configuration of the metal plunger employed in the pressing operation. This plunger is made by turning it in a lathe to have the desired stepped profile after which it is polished. The inner surfaces of each annular prism in the glass are formed by a substantially cylindrical portion of the mold tapered at least a sufficient amount to provide draft, and a substantially flat area extending outwardly. The angles between these surfaces vary according to the position the particular prism has relative to the light source. In general, the mold axis coincides with the lamp axis but it may merely intersect it, so that the prisms are in planes oblique to the lamp axis.

This invention contemplates providing those prism surfaces which are formed by the substantially cylindrical portion of the mold, i. e., the prism surfaces which are vertical or nearly vertical, with corrugations which are parallel to the mold axis. Important advantages are secured thereby. The light passing through these corrugations on the incident surface is spread laterally before striking the exterior surface of the glass. In a prismatic reflector, this lateral spreading increases the angle of incidence at the exterior surface, which increases the angular range throughout which total reflection occurs, thereby increasing the efficiency of the reflector. In addition to this, the light which is transmitted through the reflector is diffused laterally by the corrugations so that much more satisfactory lighted appearance of the outside of the reflector is obtained.

In a refractor, the lateral spreading caused by the corrugations similarly increases the lateral spread of the refracted light as it leaves the refractor surface.

The accompanying drawings show, for purposes of illustrating the present invention, several embodiments in which the invention may take form, it being understood that the drawings are illustrative of the invention rather than limiting the same. In these drawings.

Figure 1:
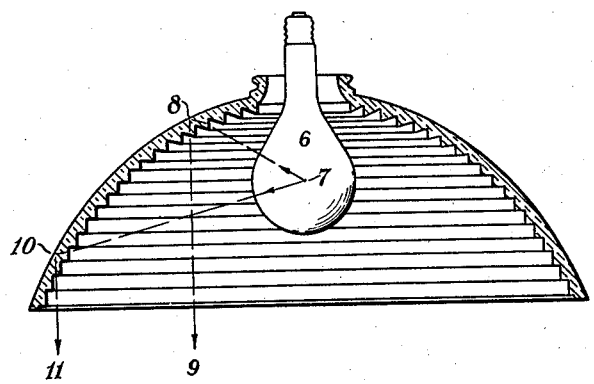
Fig. 1 represents, in cross section, a typical prismatic reflector which is smooth outside and has horizontal prisms on the inside.
Figure 2:
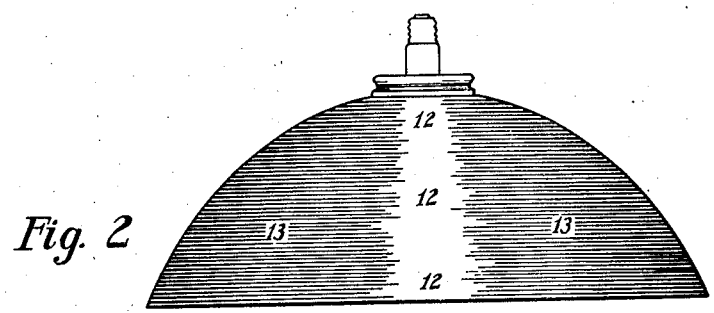
Fig. 2 represents a front elevational view of such a reflector.

In Fig. 1 the prismatic reflector is shown with its axis vertical. The lamp 6 has its light center located at 7. Typical light rays are shown at 7—8—9 and 7—10—11. A light ray strikes the vertical surface of a prism on the inside of the reflector. It is usually refracted slightly and strikes the outer surface of the reflector at points such as 8 or 10, at an angle at which total internal reflection occurs. The light ray is then reflected down through the horizontal or nearly horizontal surface of the prism and passes out through the mouth of the reflector. Due to the fact that the light source 7 is not an exact point source but has some width and height, there are other rays not shown, which strike the surface of the reflector at 8 and 10 at slightly different angles from those indicated in Fig. 1. Some of these light rays are likely to be transmitted and in actual practice a reflector of this kind transmits a certain amount of light at various angles in the vertical plane and with slight lateral spread, owing to the width of the source. Therefore, when the reflector is viewed from the outside, this transmitted light appears as a bright radial band running up and down through the center of the reflector. This is illustrated at 12 in Fig. 2. The lack of lateral diffusion causes the balance of the reflector 13 to have less surface brilliancy or to look comparatively dark because it is lighted only by the small amount of stray light which is scattered in all directions.

Figure 3:
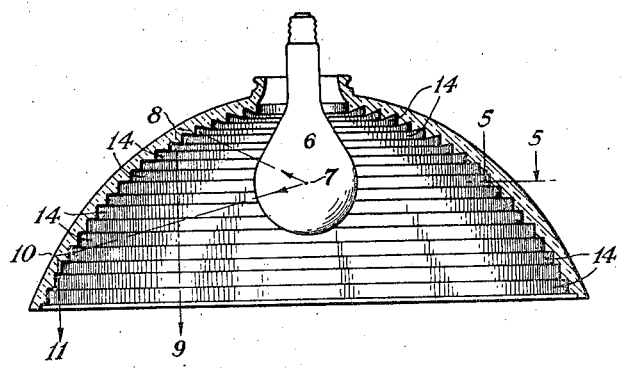
Fig. 3 is a sectional view through a similar reflector on which the subsidiary prisms or corrugations have been added to the incident or vertical surface of the prisms.

Fig. 3 shows a reflector similar to Fig. 1 except that the incident surfaces of the prisms are now provided with vertical corrugations 14. These vertical corrugations have no effect upon the path of the light rays as projected onto a vertical plane. Light rays pass through the reflector in the paths indicated by 7—8—9 and 7—10—11 in Fig. 3 in the same way as Fig. 1. The light is spread sideways however, so that the part which is transmitted no longer produces the bright vertical band 12 shown in Fig. 2. If the vertical corrugations are designed to give perfect lateral diffusion, the entire surface of the reflector will appear dimly luminous by transmitted light. If the vertical corrugations are of some other shape, a certain degree of lateral spread is attained and in any event, great improvement over the conditions shown in Fig. 2 results.

Figure 4:
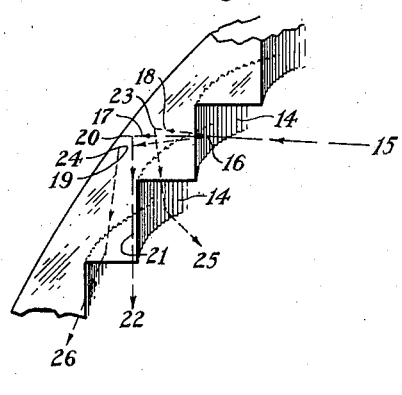
Figs. 4 and 4a show a fragment of the reflector illustrated in Fig. 3.
Figure 4A:
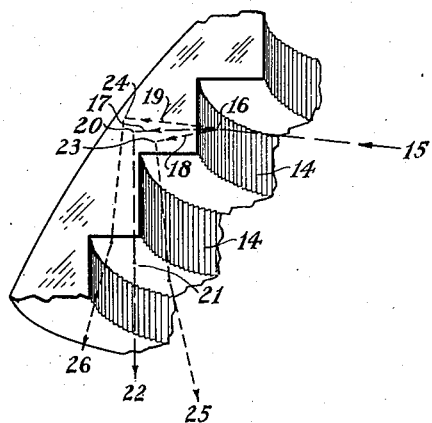

Figs. 4 and 4a show an enlarged fragment of the reflector shown in Fig. 3. A typical light ray 15 enters a prism at 16 on the surface on which the vertical corrugations 14 appear. The corrugations spread the light ray laterally as indicated by three typical rays 17, 18, and 19 inside the glass. Ray 15—17 goes through without lateral deviation, strikes the outside reflecting surface at the point 20, is totally reflected and passes down through the flat substantially horizontal surface of the prism at 21. The emerging ray 22 is in the same vertical plane as the entering ray 15. The other two typical rays of the laterally diffused light in the glass are shown at 18 and 19. These strike the outer surface at points 23 and 24. They are reflected downwardly through the same flat substantially horizontal surface of the prism, emerging at 25 and 26. These light rays are spread laterally away from light ray 22.

Obviously light rays 18 and 19 strike the outer surface of the reflector at greater angles of incidence than light ray 17. Since the light source is not an exact point each of these light rays is accompanied by other light rays at slightly different angles. Some of these are transmitted at the outer surface of the reflector but the amount of light so transmitted is decreased by the increased angle of incidence at 23 and 24 as compared with 20. The efficiency of the reflector is thereby increased. The light which is transmitted is spread out or diffused laterally.

Figure 5:
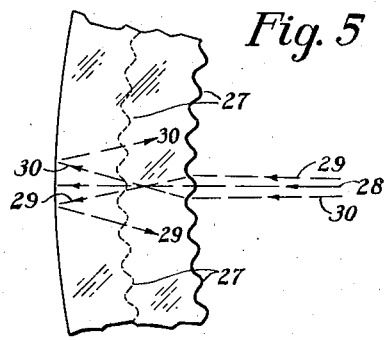
Figs. 5 and 6 are enlarged fragmentary sectional views on the line 5—5 of Fig. 3, illustrating the use of corrugations having respectively the character of flutes, designed for symmetrical light distribution, and prisms designed for asymmetric light distribution.
Figure 6:
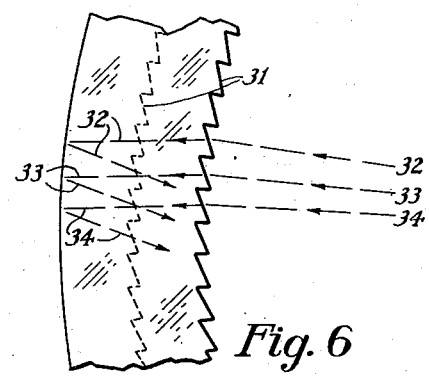

The vertical flutes or corrugations may have any desired cross section. They may be shallow flutes giving slight diffusion, or they may be deep flutes of the so-called Blondel type, or they may be approximately 90° prisms with rounded tops and bottoms such as produced by the usual form of knurl. Such a rounded prism or flute 27 is illustrated in Fig. 5 which is a fragment of a horizontal section on the line 5—5 of Fig. 3. Light rays 28, 29 and 30 show how lateral diffusion is produced by these flutes. Where the horizontal section of the flutes or subsidiary prisms is of the nature of an isosceles triangle, the lateral diffusion is symmetrical. It is also possible to make these corrugations in the form of prisms to have the cross section of a scalene triangle so as to refract the light sideways and build up the reflected light in certain zones as illustrated in Fig. 6. Here prisms 31 receive rays 32, 33, 34 and refract them as indicated. Such a reflector is therefore asymmetric. It is, of course, understood that the rays reaching the outer surface of the glass are reflected by it and sent through the transmitting surfaces of the prisms. By varying the angles of these prisms and employing prisms of isosceles triangle section either alone or in conjunction with prisms of scalene triangle section, various types of symmetrical and asymmetrical light distribution may be obtained. However, it is preferred that the corrugations be of a shape that they will not produce angles of incidence greater than about 45 degrees, after the manner as shown in Figures 5 and 6.

Figure 7:
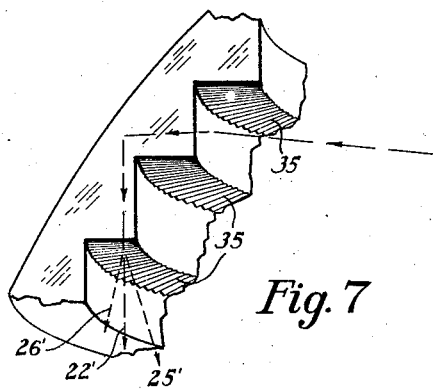
Fig. 7 is a fragmentary view similar to Fig. 4a showing subsidiary prisms or corrugations on the emergent or horizontal surface of the prisms.

In order to increase the angle of incidence at the outer surface and to spread the transmitted light, it will be obvious that the corrugations should be supplied on the incident or substantially vertical surfaces. Such corrugations diffuse the light laterally or redirect it laterally before it strikes the outer surface of the reflector or refractor. If the corrugations were placed on the horizontal surfaces of the prisms, the light would be diffused only after reflection and certain objects of the invention would not be attained. However, in the case of reflectors, corrugations may be placed on these substantially horizontal surfaces for the purpose of redirecting light after reflection. Thus, if a certain degree of concentration is obtained with a reflector of this character and with substantially smooth horizontal surfaces, the concentration may be modified and the light redirected by placing on the horizontal surface of prismatic or fluted formation which will diffuse or redirect light. Such prisms are shown at 35 in Fig. 7. The divergence of the emitted rays is indicated at 22', 25' and 26'.

Figure 8:
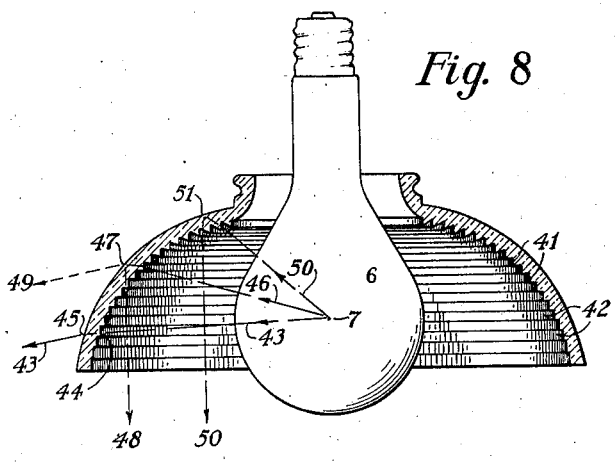
Fig. 8 is a cross section of a typical prismatic refractor which is smooth outside and has horizontal prisms on the inside on which the subsidiary prisms or corrugations have been added.

Fig. 8 shows a prismatic refractor in which the principles of this invention are carried out. This refractor is designed to distribute the light at wide angles, spreading the light over a large area as would be desirable in street lighting or in any lighting service where the spacing between lights is necessarily great. The refractor is shown with its axis vertical. The lamp 6 has light-center at 7. Prisms 41 are shown on the interior surface with vertical corrugations 42. A typical light ray 43 proceeds from the light-center 7, strikes the interior surface of a prism at 44, is slightly refracted, proceeds to the exterior surface of the refractor and is refracted again at point 45, proceeding in the desired direction 43. Another light ray 46, somewhat higher on the refractor, is acted upon in a similar manner but when this light ray strikes the outer surface 47, it strikes at an angle close to the critical angle and there is consequently a considerable degree of reflection. Therefore, a certain percentage of the light is reflected downward in light ray 48 while another portion of the light is refracted outward in light ray 49. Both of these rays are useful in illuminating the area which it is desired to illuminate. Another light ray 50 proceeding from the light-center 7, is acted upon in a similar manner but when this strikes the outer surface at point 51, the angle of incidence is greater than the critical angle and total reflection occurs the same as in Fig. 3. The light ray is therefore reflected downward as shown. Therefore, in Fig. 8 we have a combined reflector and refractor in which both reflected and refracted light is useful. The vertical corrugations on the inner surfaces of the prisms spread the light laterally before it strikes the outer surface. This increases somewhat the tendency toward total reflection but due to the shape of the refractor, it does not insure total reflection except near the top of the refractor. The spread of the light laterally, however, produces a lateral spread of the refracted light as it leaves the refractor surface. This gives a much better lighted appearance to the refractor than would otherwise be the case. Also it provides means for obtaining asymmetric distributions. For example, if the vertical corrugations are in the form of prisms as illustrated in Fig. 6, the refracted light will be spread sideways in one direction only and desired types of lateral redirection may thereby be obtained.

Figure 9:
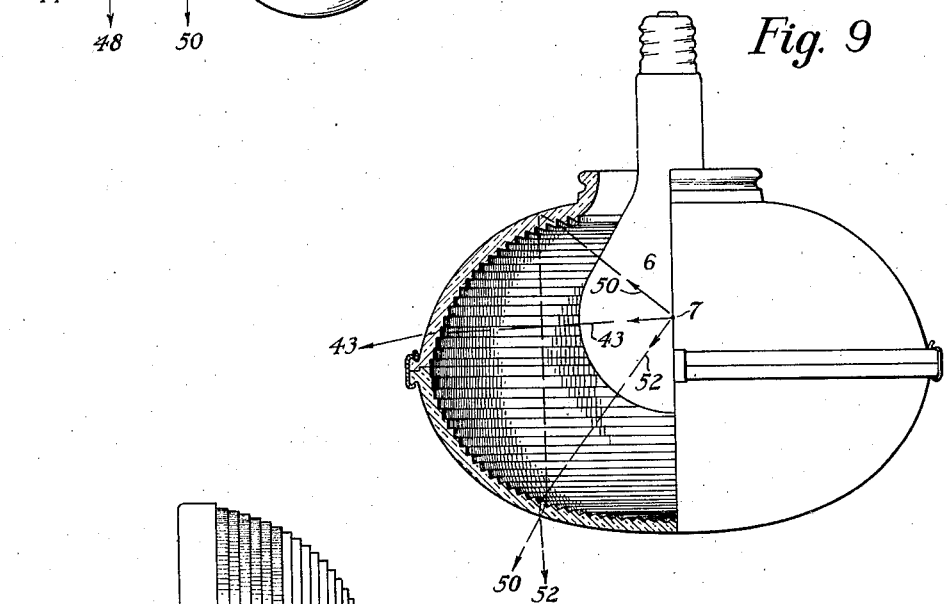
Fig. 9 shows, half in section and half in front view, a similar refractor to which has been added a bottom piece on which horizontal prisms also carry the corrugations.

Fig. 9 shows a similar refractor to which has been added a bottom bowl. This serves the double purpose of controlling light and also protecting the lamp by providing a totally enclosing globe. The lamp 6 is shown with light-center at 7. Typical light rays which are reflected, as for example light ray 50, now strike the bottom bowl and are diffused or redirected in accordance with whatever design of prism is used on the bottom bowl. In this particular illustration, horizontal prisms are used with corrugations on the vertical surfaces. The reflected light such as ray 50 and direct light such as ray 52 may strike the upper substantially horizontal surface or the lower generally vertical surface of the prism and be redirected accordingly. Vertical corrugations may be used on the vertical surfaces to diffuse the light or to redirect it laterally. Corrugations (of the nature shown in Fig. 7) may be used on the generally horizontal surfaces to redirect light laterally or to diffuse it as desired. A typical light ray which is refracted from the upper refractor is shown at 43.

In the manufacture of molds for pressing glass refractors and reflectors of the type above described, it is difficult to place the corrugations on the surfaces of horizontal prisms having small dimensions vertically. Where the corrugations are to have accurately predetermined shape, one can make the plunger, which presses the glass, in horizontal sections so that each section can be milled individually. This is expensive. Another method is to use what is known as an end mill in which a rotating point does the cutting. This is also expensive and does not result in a uniform and complete job. Another method is to chip the corrugations in by hand but this inevitably results in less accurate workmanship than is obtained with milling cutters.

Figure 10:
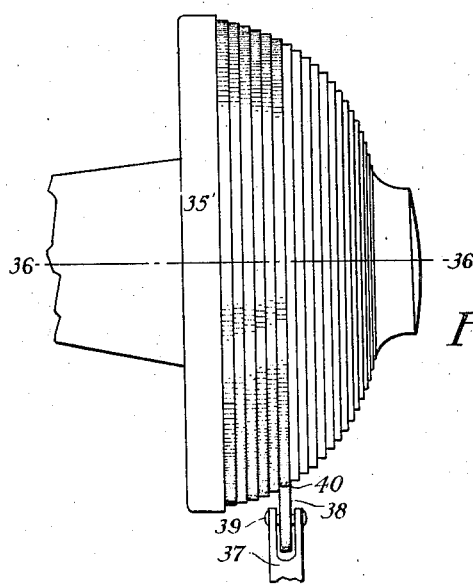
Fig. 10 is an elevational view illustrating the knurling of the plunger so as to produce corrugations in the glass.

For most purposes knurling may be employed to produce satisfactory vertical corrugations in the plunger. Fig. 10 shows a plunger for pressing glass as set up on a lathe with knurling tool in position. This is a plan view. The observer is looking down on the plunger from above. The plunger 35' rotates upon its axis 36. A tool 37 is held rigidly in the tool holder of the lathe. This tool carries the knurl wheel 38 and as the plunger rotates it produces rotation of the wheel 38 on its axis 39. Pressure is applied by forcing the wheel tightly against the plunger at the point 40. As the pressure increases, the pattern on the wheel is pressed into the plunger since the wheel 38 is made of harder material than the plunger 35. The pressure at 40 is increased by feeding the tool in until the pattern is properly formed. In Fig. 10 the surfaces of the prisms at the left of the wheel have already been knurled while those at the right of the wheel are shown before knurling. The surfaces may be knurled in far less time than would be necessary to apply vertical corrugations in any other way. While not as accurate as milled corrugations, the results are, nevertheless, good and provide a marked improvement in reflectors of this type over prismatic constructions in which no vertical corrugations are used.

The prismatic surfaces have been referred to herein as horizontal and vertical for convenience because they run substantially in such directions in the reflectors indicated in the figures. It should be understood, however, that the surfaces are rarely exactly horizontal or exactly vertical. They may vary considerably from each direction, depending upon the needs of the prismatic design for obtaining the best angles of refraction of the entering and emerging light. It will be obvious also that the glass ware, or various parts of it may be tipped or set at some other angle in which case the surfaces which are here shown as approximately horizontal or approximately vertical, would be correspondingly changed.

The refractors and reflectors described herein have been referred to as smooth outside. Ordinarily this construction is used with such smooth glass outside but it will be understood that it is not necessary to have an absolutely smooth exterior surface. Sometimes it is advantageous to break up the transmitted light somewhat more than can be done with a smooth outside surface. The outside surface is then etched, fluted, rippled or pebbled to a slight degree. This may interfere slightly with the efficiency of the surface but careful application of such slightly diffusing elements will not cause serious interference with light control. The invention is of value with all reflectors having prisms on the inside which direct light toward the exterior surface at angles such that total reflection tends to occur at the exterior surface, as well as to refractors.

This application is filed as a continuation in part of my application Serial No. 625,330, filed July 28, 1932.

It is obvious that the invention may be embodied in many forms and constructions within the scope of the claims, and I wish it to be understood that the particular forms shown are but a few of the many forms. Various modifications and changes being possible, I do not otherwise limit myself in any way with respect thereto.

What is claimed is:

1. A prismatic light controlling device carrying prisms on its inner or light incident surface whereby light is directed toward its outer surface at angles such that the light is redirected by said outer surface, the prism surfaces at which the light enters carrying corrugations which spread the light in directions parallel to the prisms, the angles between the inner and outer surfaces being such that reflection of a large part of the light occurs at the outer surface.

2. A light controlling device as claimed in claim 1, wherein the corrugations are in the form of prisms which spread the light asymmetrically in said directions.

3. A prismatic light controlling device substantially smooth outside and carrying prisms on its inner or light incident surface whereby light is directed toward its outer surface at angles such that light is redirected by said outer surface, the prism surfaces at which the light enters carrying corrugations which spread the light in directions parallel with the prisms.

4. A prismatic light controlling device as claimed in claim 3, wherein the angles between the inner and outer surfaces are such that total reflection tends to occur at the outer surface.

5. A prismatic reflector carrying prisms on its inner surface whereby light is directed toward the outer surface at angles such that total reflection of a large part of the light occurs at the outer surface, the prism surfaces at which the light enters carrying corrugations which increase the amount of light acted upon by total reflection.

6. A prismatic light controlling device having an outer surface and carrying prisms on its inner surface, each prism having one face approximately vertical and another face approximately horizontal, the approximately vertical faces carrying vertical corrugations which spread the light in horizontal directions before it reaches the outer surface.

7. A prismatic light controlling device as claimed in claim 6, having corrugations on the horizontal faces which spread the light in vertical planes as it is emitted therefrom.

8. An annular prismatic reflector having a plurality of prisms with incident and transmitting surfaces, the prisms being parallel to one another and in planes normal to the reflector axis, whereby light originating at a predetermined point along the reflector axis is directed toward the outer surface at such angles that reflection of a large part of the light occurs at said outer surface and the reflected ray is transmitted through the transmitting surfaces, the incident surfaces carrying corrugations for lateral spreading of the light inside the reflector.

9. A prismatic reflector of gradually increasing diameter from top to bottom and having a substantially smooth outer surface and an inner surface composed of substantially flat annular light transmitting surfaces and substantially cylindrical light incident surfaces, arranged at predetermined angles to one another and to the external surface for reflection of a large part of the light by the outside surface of light from a fixed light source and its transmission in predetermined directions, characterized in that the light incident surfaces are provided with corrugations parallel with the axis for laterally spreading light so as to reach the outer surface at a greater angle of incidence.

10. A prismatic glass article of gradually increasing diameter from top to bottom having annular prisms, the prisms at the smaller diameter being reflecting prisms, prisms at the larger diameter being refracting prisms, and the refractive nature of the intermediate prisms increasing with the diameter of the article.

11. A luminair comprising a light source, a prismatic enclosure of gradually increasing diameter from top to bottom with the light source at its axis and having small diameter reflecting prisms at angles for reflecting light out through the large diameter part of the enclosure, and large diameter refracting prisms for transmitting light outwardly through the walls of the enclosure at controlled angles relative to the axis, the intermediate prisms partially reflecting light into the same general direction as the small diameter prisms and partially refracting light into the same direction as the large diameter prisms.

12. A luminair as claimed in claim 11, having a prismatic cover over the opening of the enclosure adapted to transmit and redirect direct light from the light source and light received from the reflecting prisms.

13. A luminair comprising a light source, a prismatic light reflector about the light source for redirecting the dominant light in controlled directions, the reflector being characterized by the transmission of light whereby its outer surfaces present a contrasting bright streak between the observer and the light source, the reflector having corrugations on the incident surfaces for laterally diffusing the light to be transmitted whereby the brightness of the streak is reduced and its apparent width increased.

THOMAS W. ROLPH.